United States Patent
Ueno et al.

(10) Patent No.: US 10,739,004 B2
(45) Date of Patent: Aug. 11, 2020

(54) JET ENGINE, FLYING OBJECT AND METHOD OF OPERATING JET ENGINE

(71) Applicant: MITSUBISHI HEAVY INDUSTRIES, LTD., Tokyo (JP)

(72) Inventors: Yoshihiko Ueno, Tokyo (JP); Shojiro Furuya, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 419 days.

(21) Appl. No.: 15/123,431

(22) PCT Filed: Feb. 18, 2015

(86) PCT No.: PCT/JP2015/054463
§ 371 (c)(1),
(2) Date: Sep. 2, 2016

(87) PCT Pub. No.: WO2015/151620
PCT Pub. Date: Oct. 8, 2015

(65) Prior Publication Data
US 2017/0067637 A1    Mar. 9, 2017

(30) Foreign Application Priority Data

Mar. 31, 2014  (JP) ................................. 2014-074215

(51) Int. Cl.
*F23R 3/00*  (2006.01)
*F23R 3/28*  (2006.01)
(Continued)

(52) U.S. Cl.
CPC ................. *F23R 3/28* (2013.01); *F02K 7/18* (2013.01); *F23R 3/002* (2013.01); *F23R 3/10* (2013.01);
(Continued)

(58) Field of Classification Search
CPC .... F23R 3/28; F23R 3/002; F23R 3/10; F23R 3/22; F23R 3/24; F05D 2240/35;
(Continued)

(56) References Cited

U.S. PATENT DOCUMENTS 3,430,446 A * 3/1969 McCloy .................... F02K 7/14
                                                         60/768
4,202,172 A * 5/1980 Brunner .................... F02K 7/20
                                                         60/245
(Continued)

FOREIGN PATENT DOCUMENTS

JP      2-275051    11/1990
JP      5-256195    10/1993
(Continued)

OTHER PUBLICATIONS

International Search Report dated May 26, 2015 in corresponding International Application No. PCT/JP2015/054463.
(Continued)

*Primary Examiner* — Todd E Manahan
*Assistant Examiner* — Edwin Kang
(74) *Attorney, Agent, or Firm* — Wenderoth, Lind & Ponack, L.L.P.

(57)    ABSTRACT

The jet engine includes an inlet and a combustor. The inlet (11) takes air. The combustor burns fuel with the air. The combustor includes an injector (20). The injector (20) has an opening (31) through which the fuel is injected. The injector (20) includes a self-extinguishing member (32). The self-extinguishing member (32) self-extinguishes with time in a flight so that the injection direction of the fuel is modified.

9 Claims, 15 Drawing Sheets

(51) Int. Cl.
*F02K 7/18* (2006.01)
*F23R 3/22* (2006.01)
*F23R 3/10* (2006.01)

(52) U.S. Cl.
CPC .............. *F23R 3/22* (2013.01); *F05D 2220/80* (2013.01); *F05D 2240/35* (2013.01)

(58) Field of Classification Search
CPC .......... F05D 2250/90; F02K 7/17; F02K 7/10; F02K 9/78; F02C 9/44
See application file for complete search history.

(56) References Cited

U.S. PATENT DOCUMENTS

| | | | |
|---|---|---|---|
| 4,381,642 A * | 5/1983 | Giles, Jr. | .................... F02K 7/18 60/204 |
| 5,072,582 A | 12/1991 | Harshman | |
| 5,174,524 A | 12/1992 | Amneus, III | |
| 5,280,705 A * | 1/1994 | Epstein | ..................... F23R 3/28 60/247 |
| 6,293,091 B1 * | 9/2001 | Seymour | ................. F02K 1/008 60/225 |
| 2008/0141921 A1 * | 6/2008 | Hinderks | .................. B63B 1/28 114/274 |

FOREIGN PATENT DOCUMENTS

| | | |
|---|---|---|
| JP | 5-340307 | 12/1993 |
| JP | 2001-193564 | 7/2001 |
| JP | 2012-144984 | 8/2012 |
| JP | 2012-202226 | 10/2012 |
| JP | 2012-207555 | 10/2012 |

OTHER PUBLICATIONS

International Preliminary Report on Patentability dated Oct. 4, 2016 in corresponding International Application No. PCT/JP2015/054463.

Extended European Search Report dated Jan. 25, 2017 in corresponding European Application No. 15773908.7.

* cited by examiner

Fig. 10

| KIND OF MATERIAL \ APPLIED HEAT AMOUNT SHEARING FORCE | 0.2MW/m², 4.9×10² Pa | 0.4MW/m², 5.4×10² Pa | 0.6MW/m², 6.6×10² Pa | 0.7MW/m², 7.1×10² Pa | 2MW/m² |
|---|---|---|---|---|---|
| SKY-HULLO (E712/720, NIHON TOKUSHU TORYO CO. LTD.) | 0.01 | 0.14 | 0.23 | 0.32 | 1.08 |
| SILICA / PHENOL (SPECIFIC GRAVITY 1.6g/cm³) | 0.01 | 0.02 | 0.07 | 0.10 | 0.33 |

Fig. 11

| AVERAGE ACCELERATION OF BODY \ AMOUNT OF SHAPE CHANGE | 5mm | 20mm | 100mm |
|---|---|---|---|
| 10m/s² | 0.05 | 0.20 | 1.00 |
| 50m/s² | 0.25 | 1.00 | 5.00 |

JET ENGINE, FLYING OBJECT AND METHOD OF OPERATING JET ENGINE

TECHNICAL FIELD

The present invention relates to a jet engine, a flying object and a method of operating a jet engine.

BACKGROUND ART

Turbojet engines (including turbofan engines), ramjet engines and scramjet engines are known as jet engines for flying bodies flying faster than the speed of sound. These are jet engines which take air to operate and the speed of the taken air strongly depends on the flying speed, especially with respect to a ramjet engine and a scramjet engine.

As a flame stabilizing mechanism for holding a fuel-burning flame of a jet engine, use of a boundary layer generated on a wall surface of the combustor or a low-velocity region existing near a flame stabilizer disposed on the wall surface of the combustor is known in the art. To stabilize a flame with these approaches, it is necessary to distributedly supply fuel toward a proper region near the wall surface of the combustor (which may be also referred to as "flame holdable region", hereinafter).

FIG. 1 is a schematic section view schematically illustrating the structure of a jet engine. The jet engine 102 includes a body 110 and a cowl 140 disposed under the body 110 to form a space 150 through which gas is allowed to flow. The front lower part of the body 110 and the front part of the cowl 140 form an inlet 111 which introduces air into the space 150. The middle lower part of the body 110 and the middle part of the cowl 140 form a combustor 112 which mixes fuel and air to burn. The rear lower part of the body 110 and the rear part of the cowl 140 form a nozzle 113 which expands and exhausts the burnt gas. The combustor 112 includes fuel injectors 120. The fuel injectors 120 are disposed on a wall surface 121 corresponding to the combustor 112 of the lower part of the body 110. The combustor 112 may include a flame stabilizer (not shown) disposed on the wall surface 121 backward from the fuel injectors 120. The fuel injectors 120 inject fuel G into the space 150. The jet engine 102 mixes the air taken from the inlet 111 and the fuel G injected from the fuel injectors 120 to burn the fuel G and exhausts the burnt gas backward of the body 110 with the burnt gas expanded with the nozzle 113. As to the flame stabilization in the combustor 112, a part of the fuel G is diffused and supplied to a low-velocity region existing in the boundary layer generated on the wall surface 121 of the combustor 112, to stabilize the flame. When a flame stabilizer is disposed on the wall surface 121 of the combustor 112, apart of the fuel G is diffused and fed to a low-velocity region existing near the flame stabilizer, to stabilize the flame.

As a related art, Japanese Patent Application Publication No. 2012-202226 discloses a jet engine. The disclosed jet engine includes an air compressing section, a fuel injection section and a combustion section. The air compression section compresses air to generate compressed air. The fuel injection section injects fuel into the compressed air. The fuel is burnt in the combustion section. The fuel injection section includes an injection angle control section which changes the direction of a first injection orifice through which the fuel is injected.

CITATION LIST

Patent Literature

Patent Literature 1:
Japanese Patent Application Publication No. 2012-202226 A.

SUMMARY OF THE INVENTION

An objective of the present invention is to provide a jet engine, flying object and method of operating a jet engine which achieve a stable operation at a lower speed without largely remodeling the body. An optional and different objective of the present invention is to provide a jet engine, flying object and method of operating a jet engine which avoid fuel reaching a region in which the flame is difficult to be held, without largely remodeling the body.

A jet engine according to embodiments includes an inlet taking air and a combustor burning fuel with the air. The combustor includes an injector. The injector has an opening through which the fuel is injected. The injector includes a self-extinguishing member which self-extinguishes with time in a flight. The injection direction of the fuel is modified by the self-extinguishment of the self-extinguishing member.

A method of operating a jet engine according to embodiments is directed to a method of operating a jet engine including an inlet taking air and a combustor burning fuel with the air. The combustor includes an injector having an opening through which the fuel is injected. The injector includes a self-extinguishing member which self-extinguishes with time in a flight. The injection direction of the fuel is modified by the self-extinguishment of the self-extinguishing member. The method of operating the jet engine includes: injecting the fuel from the opening; and injecting the fuel from the opening after the self-extinguishing section is self-extinguished with time in a flight. The injection direction of the fuel after the self-extinguishment of the self-extinguishing member is different from that before the self-extinguishment of the self-extinguishing member.

The present invention effectively provides a jet engine, flying object and method of operating a jet engine which achieve a stable operation at a lower speed without largely remodeling the body. Optionally, the present invention effectively provides a jet engine, flying object and method of operating a jet engine which avoid fuel reaching a region in which the flame is difficult to be held, without largely remodeling the body.

BRIEF DESCRIPTION OF DRAWINGS

The attached drawings are incorporated in the specification to help the explanation of embodiments. It should be noted that the drawings must not be construed. as limiting the present invention to illustrated and described examples.

FIG. 10 is a table illustrating examples of self-extinguishing members of a jet engine according to an embodiment;

FIG. 11 illustrates the shape-extinguishing speeds of self-extinguishing members required in various circumstances;

DESCRIPTION OF EMBODIMENTS

In the following, a description is given of a jet engine and method of operating a jet engine according to embodiments with reference to the attached drawings. Described herein are examples in which a jet engine is applied to a flying object. In the detailed description given in the following, a large number of specifically detailed elements are disclosed for the purpose of explanation, to provide general understanding of embodiments. It would be apparent that one or more embodiments can be implemented without these specifically detailed elements.

(Concept Recognized by the Inventors)

Figure 1:
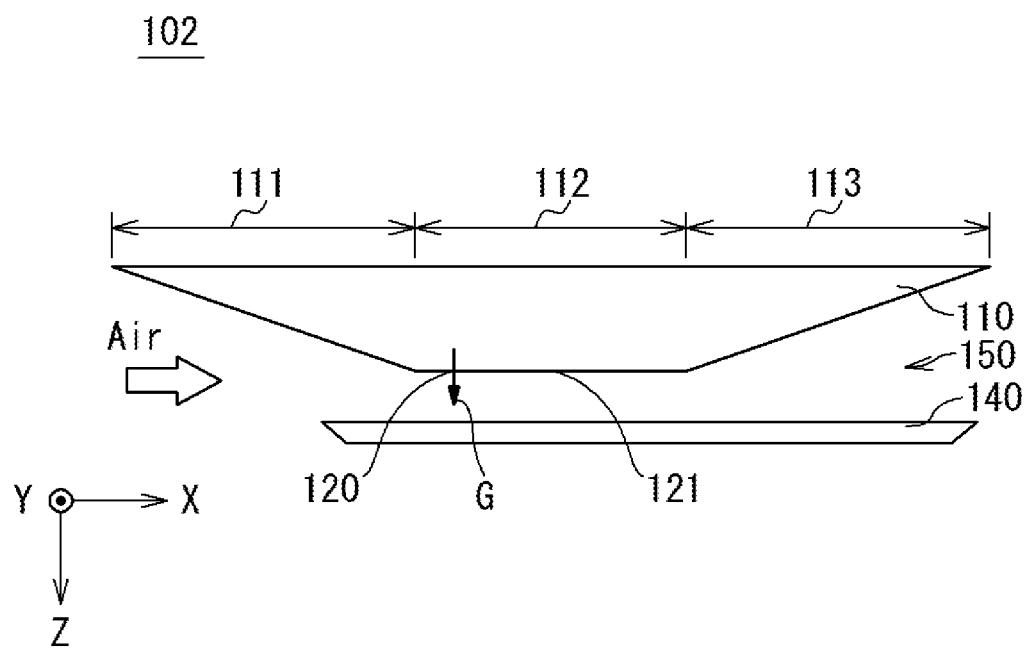
FIG. 1 is a schematic section view schematically illustrating the structure of a jet engine.

In FIG. 1, when fuel G is injected in the vertical direction (+z direction) from the fuel injectors 120, the fuel G is diffused in the flow direction of air, denoted by the legend "Air" (+x direction), while being also diffused in the vertical direction (+z direction). The distance over which the fuel G is diffused in the vertical direction (+z direction) is defined as the "penetration height" of the fuel G, hereinafter. The penetration height of the fuel G is mainly determined by the ratio of the momentum of the air Air in the flow direction (+x direction) per unit time (hereinafter, simply referred to as the momentum) to the momentum of the injected fuel G in the vertical direction (+z direction).

Figure 2:
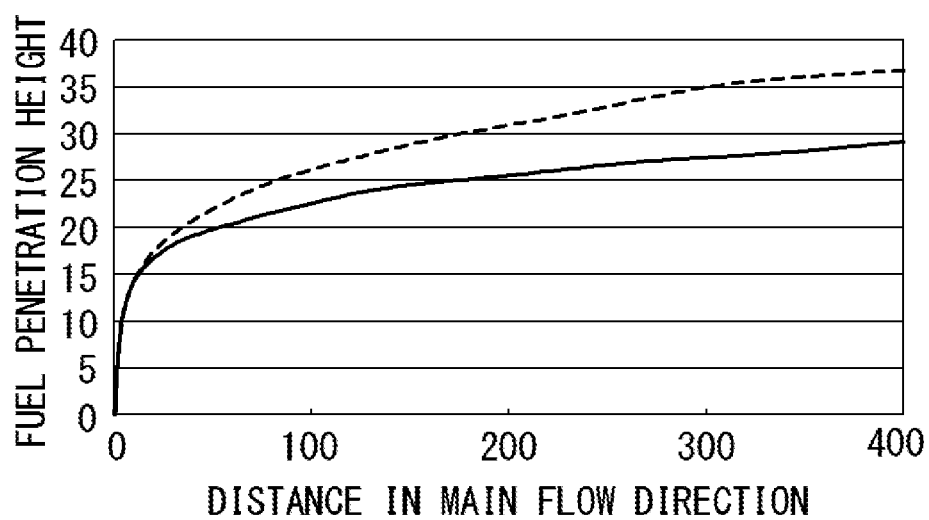
FIG. 2 is a graph illustrating the association of the penetration height of fuel with the distance over which the fuel is carried by the air.

FIG. 2 is a graph illustrating the association of the penetration height of the fuel G with the distance over which the fuel G is carried by the air Air. The vertical axis represents the penetration height of the fuel G (+z direction; arbitrary unit) and the horizontal axis represents the distance over which the fuel G is carried by the air Air (+x direction; arbitrary unit.) The origin (0) of the horizontal and vertical axes corresponds to the position of the fuel injectors 120. The broken line indicates the case when the speed of the flying object is low (the momentum of the air Air is small) and the solid line indicates the case when the speed of the flying object is high (the momentum of the air Air is large.) It should be noted that the ratio of the mass flow rates of the air Air and the fuel G and the momentum of the fuel G in the vertical direction (+z direction) are kept constant independently of the speed of the flying object.

As illustrated in FIG. 2, the penetration height tends to be low when the speed of the flying object is high (the solid line: mainly corresponding to the step of cruising.) This is because the momentum of the air Air in the flow direction is large and the fuel G is therefore easy to be carried in the flow direction. When the speed of the flying object is low (the broken line: generally corresponding to the step of acceleration), on the other hand, the penetration height tends to be high. This is because the momentum of the air Air is small and the fuel G is hard to be carried in the flow direction.

Figure 3A:
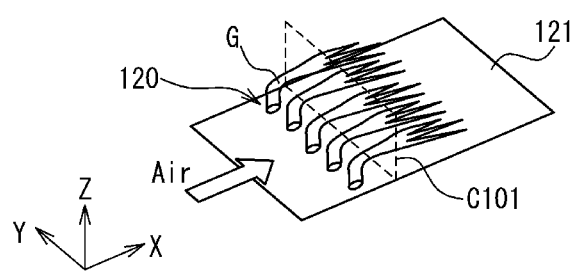
FIG. 3A is a schematic diagram schematically illustrating the fuel injection behavior of a combustor in the case when the flying speed is high.
Figure 3B:
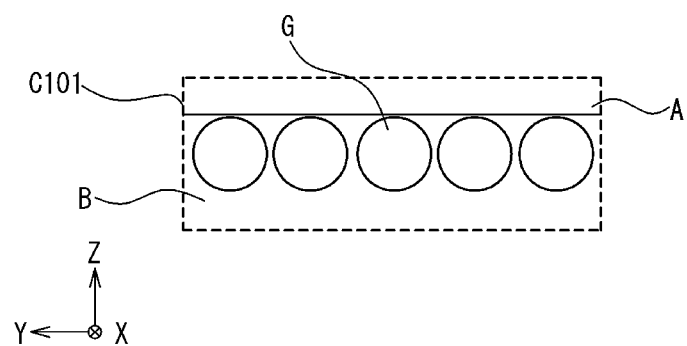
FIG. 3B is a schematic diagram schematically illustrating the fuel injection behavior of the combustor in the case when the flying speed is high.

FIGS. 3A and 3B are schematic diagrams schematically illustrating the fuel injection behavior of a combustor in the case when the flying speed is high. It should be noted that FIG. 3A is a perspective view of a portion near openings of the fuel injector 120 and FIG. 3B is a view illustrating the behavior of the fuel G on the cross-section C101 indicated in FIG. 3A. The cross-section C101 is an yz cross-section of the flow path of the air Air and the fuel G at the position apart by a given distance from the fuel injector 120. Both of FIGS. 3A and 3B are drawn upside down from FIG. 1.

As illustrated in FIG. 3A, the fuel G is supplied in the vertical direction (+z direction) from a plurality of fuel injectors 120 disposed on the wall surface 121 of the combustor 112. The fuel G is then carried in the flow direction (+x direction) by the air Air taken through the inlet 111. As illustrated in FIG. 3B, the fuel G passes through a region B in which the flame can be hold (flame holdable region) on the cross-section C101 (yz cross-section); the fuel G does not pass a region A in which the flame is difficult to be held (flame holding difficult region). This is because the speed of the flying object is high and the penetration height of the fuel G is low due to a large momentum of the air Air (see FIG. 2 if necessary.)

Figure 4A:
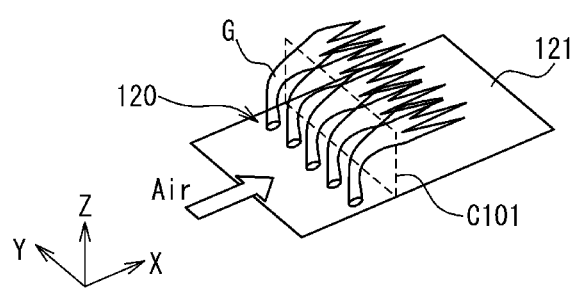
FIG. 4A is a schematic diagram schematically illustrating the fuel injection behavior of the combustor in the case when the flying speed is slow.
Figure 4B:
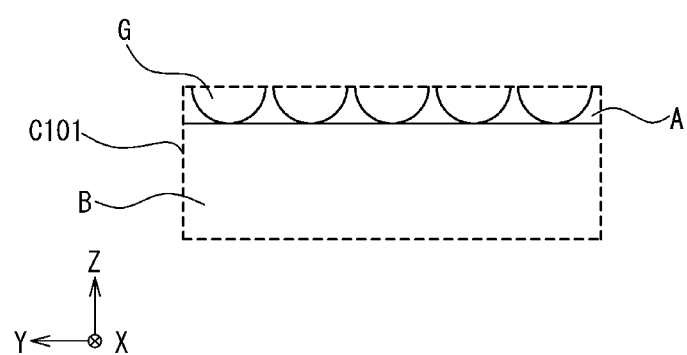
FIG. 4B is a schematic diagram schematically illustrating the fuel injection behavior of the combustor in the case when the flying speed is slow.

FIGS. 4A and 4B are schematic diagrams schematically illustrating the fuel injection behavior of the combustor in the case when the flying speed is low. It should be noted that FIG. 4A is a perspective view of a portion near the openings of the fuel injectors 120 and FIG. 4B is a view illustrating the behavior of the fuel G on the cross-section C101 indicated in FIG. 4A; both of FIGS. 4A and 4B are drawn upside down from FIG. 1.

As illustrated in FIG. 4A, the fuel G is supplied in the vertical direction (+z direction) from a plurality of fuel injectors 120, as is the case with FIG. 3A. The fuel G is then carried in the flow direction (+x direction) by the air Air. As illustrated in FIG. 4B, the fuel G passes through the flame holding difficult region A on the cross-section C101 (yz cross-section), being unable to pass through the flame holdable region B, differently from the case of FIG. 3B. This is because the flying speed is low and the penetration height of the fuel G is high due to a small momentum of the air Air (see FIG. 2 if necessary.) In this case, there is a possibility that the jet engine 102 cannot operate due to the difficulty in flame holding. This makes it difficult to use the jet engine 102 at a lower speed.

First Embodiment

Figure 5:
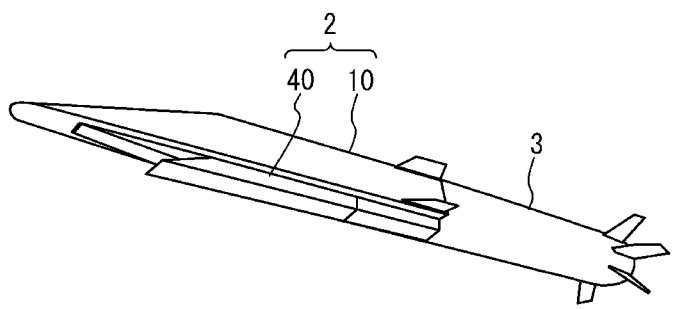
FIG. 5 is a perspective view illustrating an exemplary structure of a flying object according to an embodiment.

A description is given of the structure of a flying object 1 according to the present embodiment. FIG. 5 is a perspective view illustrating an exemplary structure of the flying object 1 according to the present embodiment. The flying object 1 includes a jet engine 2 and a rocket motor 3. When the flying object 1 is launched from a launcher, the rocket motor 3 accelerates the flying object 1 from the speed at the time of starting a flight to a desired speed. It should be noted that that the speed at the time of starting a flight is zero for the case when the flying object 1 is launched from a stationary launcher and, when the flying object 1 is launched from a moving body in motion (or flying body in a flight), the speed at the time of starting a flight is the moving speed (flying speed) of the moving body (or flying body). The jet engine 2 further accelerates the flying object 1 to allow the flying object 1 to fly towards a target, after the rocket motor 3 is detached from the flying object 1. The jet engine 2 includes a body 10 and a cowl 40. The body 10 and the cowl 40 form an inlet, a combustor and a nozzle of the jet engine 2, as described later. The jet engine 2 takes air from the inlet from the front, mixes the air and fuel in the combustor, burns the fuel with the air, expands the burnt gas in the nozzle and emits the burnt gas backward. This allows the jet engine 2 to obtain a thrust force.

Figure 6:
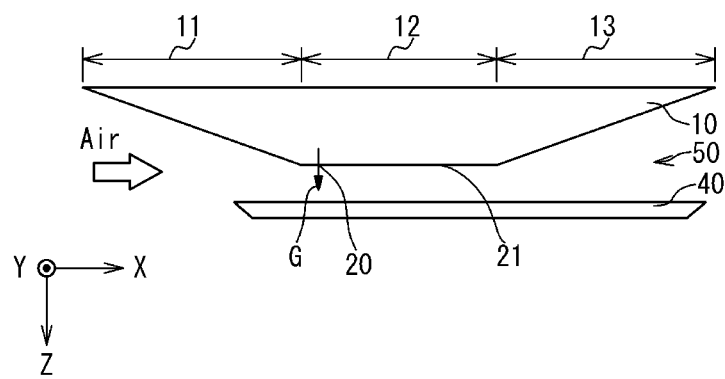
FIG. 6 is a schematic section view schematically illustrating an exemplary structure of a jet engine according to an embodiment.

A description is then given of a jet engine according to the present embodiment. FIG. 6 is a schematic section view schematically illustrating an exemplary structure of a jet engine according to the present embodiment. The jet engine 2 includes a body 10 and a cowl 40 disposed under the body 10 to form a space 50 through which gas is allowed to flow. The front lower part of the body 10 and the front part of the cowl 40 form an inlet 11 which introduces air into the space 50. The middle lower part of the body 10 and the middle part of the cowl 40 form a combustor 12 which mixes fuel and air to burn the fuel. The rear lower part of the body 10 and the rear part of the cowl 40 form a nozzle 13 which expands and exhausts the burnt gas. The combustor 12 includes fuel injectors 20.

The fuel injectors 20 are disposed on a part corresponding to the combustor 12 of a wall surface 21 of the lower part of the body 10. The fuel injectors 20 inject fuel G stored in the body 10 into the space 50 in the vertical direction (+z direction). The injected fuel G is mixed with the air taken through the inlet 11 and burnt. Fuel-air mixture (not illustrated) may be initially ignited by an igniter (not illustrated). The fuel injectors 20 each have an opening disposed on the lower part of the body 10; the shape, number and arrangement of the openings may be arbitrarily modified. One example of the fuel injectors 20 include a plurality of openings arrayed in the spanwise direction of the body 10.

It should be noted that the combustor 12 may further include a flame stabilizer on the wall surface 21 positioned backward from the fuel injectors 20.

Figure 7A:
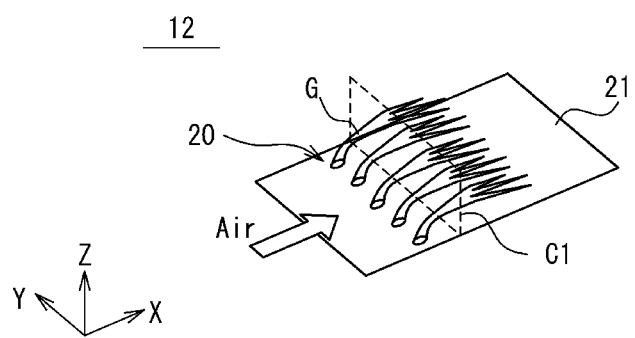
FIG. 7A is a schematic diagram schematically illustrating the fuel injection behavior in the combustor according to a first embodiment in the case when the flying speed is low.
Figure 7B:
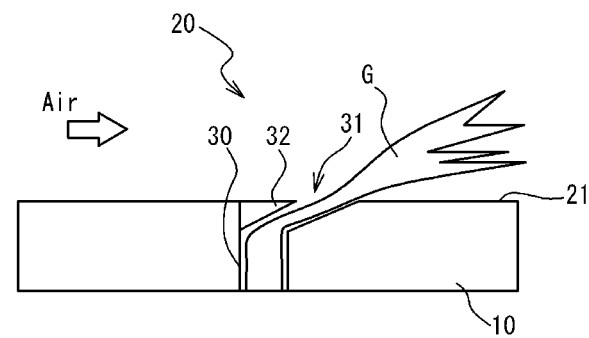
FIG. 7B is a schematic diagram schematically illustrating the fuel injection behavior in the combustor according to a first embodiment in the case when the flying speed is low.
Figure 7C:
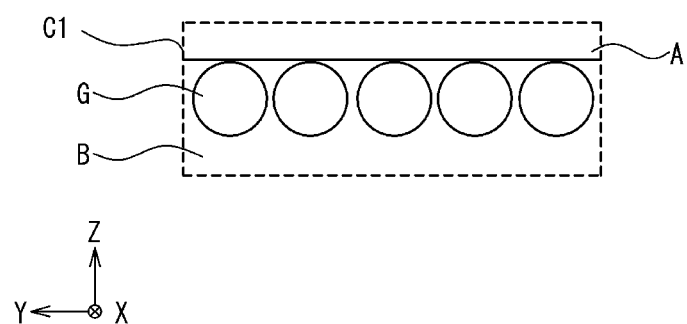
FIG. 7C is a schematic diagram schematically illustrating the fuel injection behavior in the combustor according to a first embodiment in the case when the flying speed is low.

FIGS. 7A to 7C are schematic diagrams schematically illustrating the fuel injection behavior in the combustor according to the present embodiment in the case when the flying speed is low. It should be noted that FIG. 7A is a perspective view illustrating a portion near the openings of the fuel injectors 20. FIG. 7B is a section view illustrating the portion near the openings of the fuel injectors 20. FIG. 7C is a diagram illustrating the behavior of the fuel G on the cross-section C1 illustrated in FIG. 7A. The cross-section C1 is an yz cross-section of the flow path of the air Air and the fuel G at the position apart by a given distance from the fuel injectors 20.

As illustrated in FIG. 7B, the fuel injectors 20 each include a fuel supply tube 30. Also, the fuel injectors 20 each have a fuel injection orifice (opening) 31. The fuel supply tubes 30 supply fuel G to the fuel injection orifices 31 from a fuel tank (not illustrated). The fuel injection orifices 31 inject the supplied fuel G into the space 50. The fuel injection orifices 31 have a shape elongated in the direction in which the fuel G is injected in a low-speed flight (in this case, +x direction) on the xy cross-section, compared with the fuel supply tubes 30. Furthermore, the fuel injectors 20 each include a self-extinguishing member 32.

In the present embodiment, a self-extinguishing member 32 is disposed to plug a part of a fuel injection orifice 31. The self-extinguishing member 32 partially plugs a flow path of the fuel G or partially forms a flow path of fuel G to modify the injection direction of the fuel G from the fuel injection orifice 31. In the present embodiment, the self-extinguishing member 32 partially plugs the flow path of the fuel G to modify the injection direction of the fuel G from the fuel injection orifice 31, from the vertical direction (+z direction) to an oblique direction (the direction between the +z direction and the +x direction). It should be noted that the term "vertical" in the specification means to include being substantially vertical. It should be also noted that the term "substantially vertical" means to include being at an angle from 85° to 95°.

The self-extinguishing members 32 are formed of a material which self-extinguishes due to a thermal or aerodynamic effect after a certain time elapses, in acceleration from a low speed to a high speed in a flight by the jet engine 2. More specifically, the self-extinguishing members 32 are formed of a material, the shape of which is modified due to heat, shearing force or pressure caused by the air taken through the inlet 11 and the supplied fuel (by being melted, evaporated, sublimated, chemically decomposed, burnt, peeled, eroded or by a combination of these events.) Details of the self-extinguishing members 32 will be described later.

In the present embodiment, the fuel G is typically injected from the fuel injectors 20 into the space 50 with a substantially constant mass flow rate, independently of the speed of the flying object 1. In other words, the fuel G is injected from the fuel injectors 20 into the space 50 with a substantially constant momentum, independently of the speed of the flying object 1. In this operation, as illustrated in FIGS. 7A and 7B, when the speed of the flying object 1 is low (mainly in acceleration), the fuel G is injected in an oblique direction (a direction between the +z direction and the +x direction), not in the vertical direction (+z direction), to avoid the occurrence of the event illustrated in FIGS. 4A and 4B. In other words, the momentum in the +z direction is reduced by allocating a part of the momentum of the fuel G to the +x direction. This effectively reduces the penetration height of the fuel G. As a result, as illustrated in FIG. 7C, the fuel G passes through the flame holdable region B on the cross-section C1 (the yz cross-section), not passing through the flame holding difficult region A.

Figure 8A:
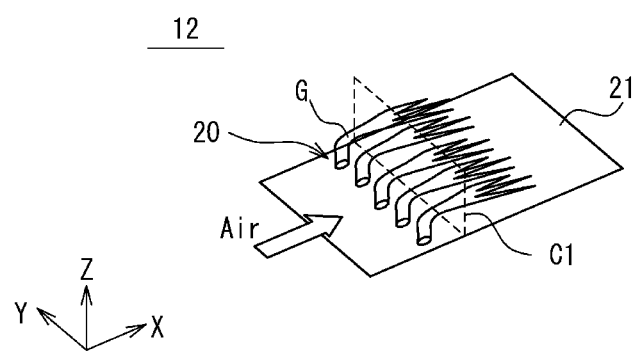
FIG. 8A is a schematic diagram schematically illustrating the fuel injection behavior in the combustor according to a first embodiment in the case when the flying speed is high.
Figure 8B:
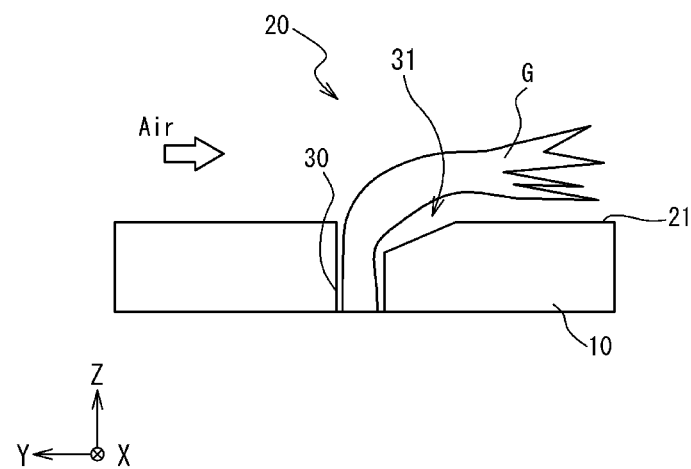
FIG. 8B is a schematic diagram schematically illustrating the fuel injection behavior in the combustor according to a first embodiment in the case when the flying speed is high.
Figure 8C:
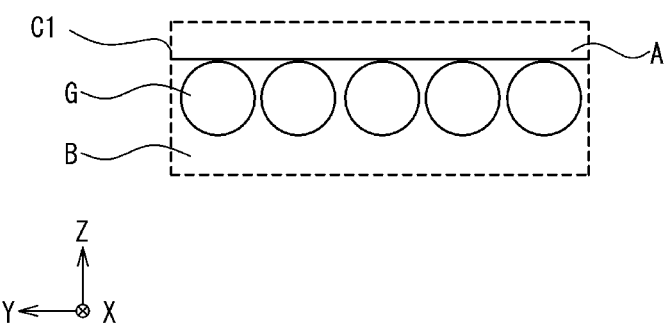
FIG. 8C is a schematic diagram schematically illustrating the fuel injection behavior in the combustor according to a first embodiment in the case when the flying speed is high.

FIGS. 8A to 8C are, on the other hand, schematic diagrams schematically illustrating the fuel injection behavior in the combustor according to the present embodiment in the case when the flying speed is high. It should be noted that FIG. 8A is a perspective view illustrating the portion near the openings of the fuel injectors 20. FIG. 8B is a section view illustrating the portion near the openings of the fuel injectors 20. FIG. 8C is a diagram illustrating the behavior of the fuel G on the cross-section C1 illustrated in FIG. 8A.

As illustrated in FIG. 8B, the self-extinguishing members 32 self-extinguish in the combustor 12, after a certain time elapses from the state illustrated in FIG. 7B. The self-extinguishment of the self-extinguishing members 32 allows the fuel injection orifices 31 of the fuel injectors 20 to inject the fuel G in the vertical direction (+z direction).

In this operation, as illustrated in FIGS. 8A and 8B, when the speed of the flying object 1 is high (mainly in cruising), the fuel G is injected in the vertical direction (+z direction). Also in this case, as illustrated in FIG. 8C, the fuel G passes through the flame holdable region B on the cross-section C1 (the yz cross-section), not passing through the flame holding difficult region A. This is because the flying speed is high and thereby the penetration height of the fuel is reduced due to a large momentum of the air Air (see FIG. 2, if necessary).

Figure 9:
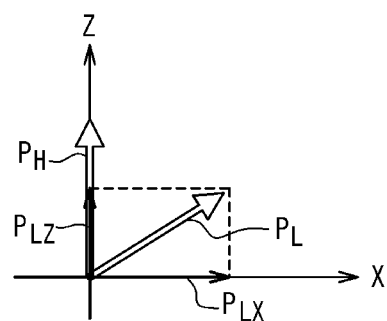
FIG. 9 is a graph illustrating the principle of the injection of fuel according to an embodiment.

A description is then given of the principle of the injection of the fuel G according to the present embodiment. FIG. 9 is a graph illustrating the principle of the injection of the fuel G according to the present embodiment. In the present embodiment, the fuel G is injected into the space 50 with a substantially constant momentum, independently of the speed of the flying object 1, and the fuel G is always supplied to a region in which the flame can be held. This achieved by the following principle: When the speed of the flying object 1 is high, the fuel G is injected in the vertical direction (+z direction) with a momentum $P_H$. In this case, the penetration height of the fuel G is reduced due to a large momentum of the air Air. This allows distributing the fuel G into the flame holdable region B.

When the speed of the flying object 1 is low, on the other hand, the fuel G is injected in an oblique direction (a direction between +z direction and a +x direction) with a momentum $P_L$, where $|P_H|=|P_L|$, from a requirement that the momentum is kept constant. In this case, the vertical component of the momentum $P_L$ is $|P_{Lz}|$, which is smaller than the momentum $|P_H|$ $(=|P_L|)$. As a result, the penetration height of the fuel G can be reduced even when the speed of the flying object 1 is low and the momentum of the air Air is thereby reduced. This allows distributing the fuel G to the flame holdable region B. It should be noted that, the injection direction of the fuel G may be a different oblique direction (e.g. a direction between the +z direction and the −x direction), since only a reduction of the vertical component $|P_{Lz}|$ of the momentum $P_L$ is desired.

In the following, a further description is given of the self-extinguishing members 32. The self-extinguishing members 32, which are formed of a material which is melted, evaporated, sublimated, chemically decomposed, burnt, peeled or eroded in a flight of the flying object 1, are preferably formed of an inflammable material. This avoids a heat load applied to a peripheral structure of the fuel injection orifices 31. Preferred examples of such self-extinguishing members include an ablation material. This is because ablation material reduces a heat load by cooling the peripheral structure with an endoergic reaction in the self-extinguishment. It should be noted that ablation material is defined as material improving the heat tolerance with an endoergic reaction accompanied by a phase transition.

It should be noted that it is not necessary for the self-extinguishing members 32 to be completely extinguished in the self-extinguishment of the self-extinguishing members 32, as long as the fuel injection orifices 31 become possible to inject the fuel G in the vertical direction (+z direction); the self-extinguishing members 32 may partially remain. In other words, the self-extinguishment of the self-extinguishing members 32 referred herein means such a reduction of the self-extinguishing members 32 that the fuel injection orifices 31 become possible to inject the fuel G substantially in the vertical direction (+z direction); it is not necessary for the self-extinguishing members 32 to be completely extinguished from the vicinity of the fuel injection orifices 31.

FIG. 10 is a table illustrating examples of self-extinguishing members 32 of a jet engine according to the present embodiment. The materials described in this table (Sky-hullo and silica/phenol) are ablation materials. This table illustrates associations of the heat amounts and shearing forces applied to these materials with shape-extinguishing speed of these materials. It should be noted that Sky-hullo (registered trade mark) is an epoxy-polyamide based heat insulation coating material manufactured by Nihon Tokusyu Toryo Co. Ltd., and the legend "silica/phenol" means phenol resin incorporating silica fibers.

From the illustration of this figure, it would be understood that the shape-extinguishing speed [unit: mm/second] varies depending the kind of material and the heat amount and shearing force applied to the material. On the contrary, the shape-extinguishing speed can be adjusted as desired by selecting the material on the basis of the heat amount and shearing force assumed to be applied to the vicinity of the fuel injection orifices 31. In other words, the transition time from the state illustrated in FIGS. 7A to 7C (low speed (mainly in acceleration)) to the state illustrated in FIGS. 8A to 8C (high speed (mainly in cruising)) can be adjusted as desired.

FIG. 11 illustrates the shape-extinguishing speeds of self-extinguishing members 32 required in various circumstances. Considered herein are the cases when the shape is modified (the self-extinguishing members 32 are extinguished) in increasing the flying speed from 500 m/s (about Mach 1.7) to 1500 m/s (about Mach 5). The circumstances include the average body acceleration and the necessary shape modification amount. The required shape extinguishing speed depends on the circumferences; however, it is possible to satisfy the requirements by adjusting the material as illustrated in FIG. 10.

Figure 12A:
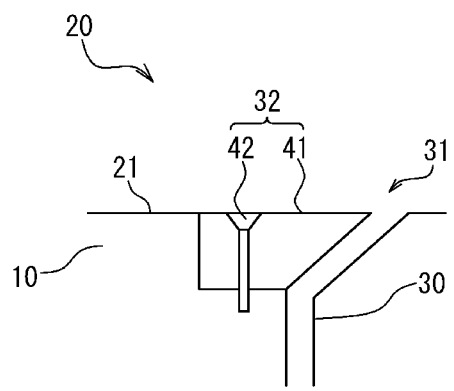
FIG. 12A is a section view schematically illustrating an example of how to attach a self-extinguishing member according to the first embodiment.
Figure 12B:
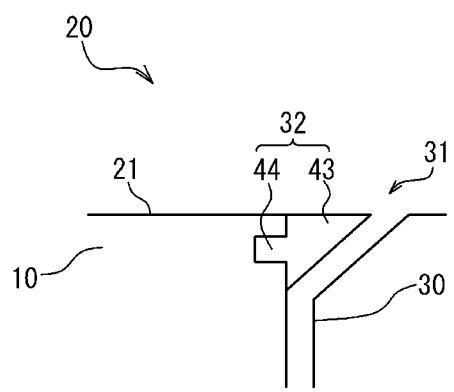
FIG. 12B is a section view schematically illustrating an example of how to attach a self-extinguishing member according to the first embodiment.

FIGS. 12A and 12B are section views schematically illustrating examples of how to attach a self-extinguishing member according to the present embodiment. In FIG. 12A, a self-extinguishing member 32 includes a self-extinguishing member main body 41 and a threaded member 42. The body 10 is recessed near a fuel injection orifice 31 on the wall surface 21 to allow a portion of the self-extinguishing member main body 41 to be placed thereon. The self-extinguishing member main body 41 is coupled with the body 10, for example, by being screwed with the threaded member 42 with a portion of the self-extinguishing member main body 41 placed on the recessed part of the body 10. The self-extinguishing member main body 41 may be coupled with the body 10 by applying an adhesive to the side face of the self-extinguishing member main body 41 to adhere with the recessed part of the body 10.

In FIG. 12B, a self-extinguishing member 32 includes a self-extinguishing member main body 43 and a protruding part 44. The body 10 is machined to form a groove or hole in a fuel injection orifice 31 to be engaged with the protruding part 44. The self-extinguishing member main body 43 is coupled with the body 10, for example, by engaging the protruding part 44 with the groove or hole thus formed. The self-extinguishing member main body 43 may be coupled with the body 10 by applying an adhesive to the protruding part 44 to be adhered with the groove or hole of the body 10, not using the threaded member 42.

A description is then given of a method of operating the flying object 1 and jet engine 2 according to the present embodiment.

The flying object 1 is launched toward a target from the installation position and accelerated by the rocket motor 3 from the state of the speed at the start of the flight to a desired speed to reach a desired height over a desired time and distance. The rocket motor 3 is then detached from the flying object 1 and the flying object 1 is subsequently accelerated by the jet engine 2 to fly.

At the initial stage (in acceleration) at which the acceleration with the jet engine 2 is started, the speed of the flying object 1 is relatively low and the self-extinguishing members 32 are attached with the fuel injection orifices 31 of the fuel injectors 20. This allows modifying the fuel injection direction of the fuel G; the fuel injection direction is set to an oblique direction (a direction between the +z direction and the +x direction), not the vertical direction (+z direction). As a result, the fuel G is injected in the oblique direction and supplied to the flame holdable region B, not reaching the flame holding difficult region A. Accordingly, the jet engine 2 can hold the flame to continuously operate (refer to FIGS. 7A to 7C if necessary).

The speed of the flying object 1 is then increased by the acceleration by the jet engine 2. This is accompanied by self-extinguishment of the self-extinguishing members 32 at the fuel injection orifices 31 with time through being melted (or evaporated, sublimated, chemically decomposed, burnt, peeled or eroded) due to the heat, shearing force or pressure of the air taken through the inlet 11 or the supplied fuel. This results in that the fuel injection direction of the fuel G becomes closer to the vertical direction (+z direction); however, the penetration height of the fuel G is not unnecessarily increased, because the speed of the air Air is increased and thereby the momentum thereof is increased. Accordingly, the fuel G is supplied to the flame holdable region B, not reaching the flame holding difficult region A. This allows the jet engine 2 to hold the flame to continuously operate.

At a stage at which the speed of the flying object 1 is relatively sufficiently increased (mainly in cruising), the self-extinguishing members 32 are extinguished. This allows directing the fuel injection direction of the fuel G to the vertical direction (+z direction); however, the penetration height of the fuel G is not unnecessarily increased, because the speed of the air Air is further increased and thereby the momentum thereof is further increased. Accordingly, the fuel G is supplied to the flame holdable region B, not reaching the flame holding difficult region A. This allows the jet engine 2 to hold the flame to continuously operate (refer to FIGS. 8A to 8C, if necessary). The flying object 1 flies substantially at a constant speed.

The flying object 1 and jet engine 2 according to the present embodiment operate as thus described.

Figure 13:
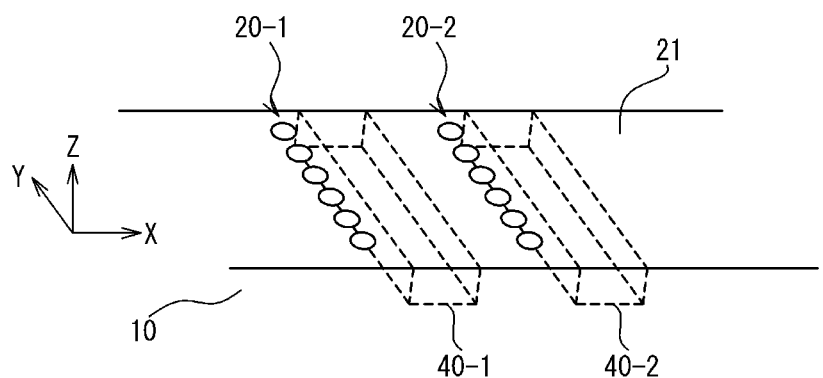
FIG. 13 is a perspective view schematically illustrating a modification example of the structure of the combustor according to the first embodiment.

FIG. 13 is a perspective view schematically illustrating a modification example of the structure of the combustor according to the present embodiment. Although FIGS. 7A to 8C illustrate that the combustor includes a plurality of fuel injectors 20-1 arrayed in the spanwise direction, the combustor may additionally include a plurality of fuel injectors 20-2 positioned backward in the flow direction of the air as illustrated in FIG. 13; the combustor may further additionally include a plurality of fuel injectors (not illustrated) positioned further backward. Although FIGS. 7A to 8C illustrate that the combustor fails to include a flame stabilizer, the combustor may include a flame stabilizer 40-1 as illustrated in FIG. 13 as illustrated in FIG. 13; the combustor may additionally include a flame stabilizer 40-2 backward in the flow direction of the air and further additionally include another flame stabilizer backward in the flow direction of the air.

In the present embodiment, a self-extinguishing member 32 formed of a material which loses its shape due to a thermal or aerodynamic effect is disposed in a part of a fuel injection orifice 31 of each fuel injector 20. This allows providing a variable fuel injector which allows modifying the injection direction of the fuel G depending on the existence or non-existence of the self-extinguishing member 32.

In the flying object 1 and jet engine 2 according to the present embodiment, a self-extinguishing member 32 is disposed in a part of the fuel injection orifice 31 of each fuel injector 20 at the initial stage at which the acceleration is started with the jet engine 2 and the speed is low (in acceleration). Accordingly, the fuel G is injected in an oblique direction to reduce the penetration height. As a result, it is possible to supply and diffuse the fuel G to the frame holdable region B even at a low speed. This effectively avoids a stop of the operation of the jet engine 2.

The momentum of the air is then gradually increased as the speed of the flying object 1 is increased, and the self-extinguishing members 32 are gradually extinguished. As a result, the injection angle of the fuel G is gradually directed close to the vertical direction and the fuel G becomes having a vertical momentum depending on the momentum of the air. This implies that it is possible to properly maintain the penetration height and diffusion of the fuel G. In other words, it is possible to supply and diffuse the fuel G to the flame holdable region B. This allows continuously operating the jet engine 2.

As a result, the flying object 1 and jet engine 2 according to the present embodiment allows providing a flame stabilizer usable in a very wide speed range from a low speed region to a high speed region, compared with conventional jet engines, without remodeling fuel injectors and the like. In other words, the flying object 1 and jet engine 2 according to the present embodiment allows increasing the speed range in which the jet engine 2 is operable, without largely remodeling the body.

In addition, with respect to a flying object 1 that uses a rocket motor 3 before operating the jet engine 2, the speed to be achieved with the rocket motor 3 (the speed range to which the flying object 1 is accelerated) can be reduced by widening the speed range in which the jet engine 2 is operable. Accordingly, the size (weight) of the rocket motor 3 can be largely reduced. This allows a size and weight reduction of the flying object 1 as a whole, further enhancing the acceleration performance.

Furthermore, by properly selecting the material, thickness and shape of the self-extinguishing members, the time necessary for modification of the shape of the self-extinguishing members (through being melted, burned, eroded, peeled or the like) can be adjusted as desired. Since this allows adjusting the penetration height of the fuel G as desired, it is possible to use a jet engine from a very low speed region without a malfunction of a jet engine. Also, it is possible to modify the shape of the self-extinguishing members (by being melted, burnt, eroded or the like) without heat generation or with heat absorption from the peripheral structure, depending on the material of the self-extinguishing members; this effectively reduces heat loading to the peripheral structure.

Second Embodiment

In the present embodiment, the structure of the self-extinguishing members is modified from the first embodiment. In the following, a description is mainly given of the difference in detail.

Figure 14:
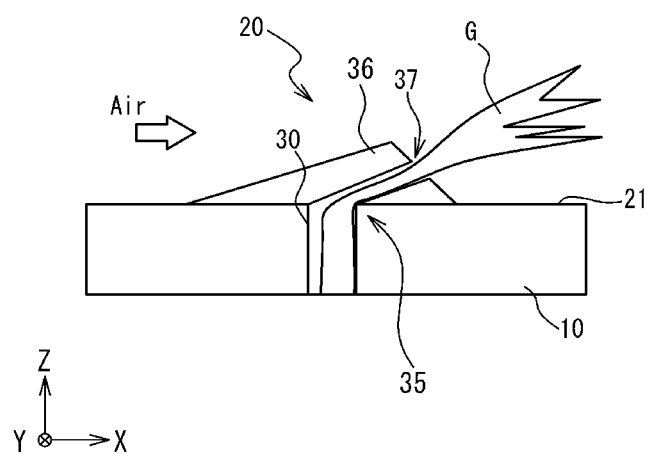
FIG. 14 is a schematic diagram schematically illustrating the fuel injection behavior in a combustor according to a second embodiment, in the case when the flying speed is low.

FIG. 14 is a schematic diagram schematically illustrating the fuel injection behavior in a combustor according to the present embodiment, in the case when the flying speed is low. It should be noted that FIG. 14 is a section view illustrating a portion near the opening of a fuel injector 20.

As illustrated in FIG. 14, the fuel injector 20 includes a self-extinguishing member 36. The fuel injector 20 additionally includes a fuel supply tube 30 and a fuel injection orifice (opening) 35. The fuel supply tube 30 supplies fuel G from a fuel tank (not illustrated) to the fuel injection orifice 35. The fuel injection orifice 35 injects the supplied fuel G to the self-extinguishing member 36 (mainly for a low speed) or the space 50 (mainly for a high speed).

The self-extinguishing member 36 is disposed to cover at least a part of the fuel injection orifice 35 on the wall surface 21, to modify the injection direction of the fuel G from the fuel injection orifice 35 by partially plugging the flow path of the fuel G or partially forming the flow path of the fuel G. In this embodiment, the self-extinguishing member 36 partially plugs the path flow of the fuel G and introduces the fuel G from the fuel injection orifice 35 to a fuel injection orifice 37 thereof, to thereby modifying the injection direction of the fuel G from the vertical direction (+z direction) to an oblique direction (a direction between the +z direction and the +x direction). In this operation, the self-extinguishing member 36, which protrudes from the wall surface 21, disturbs the flow of the air near the fuel injection orifice 37. Accordingly, it is possible to disturb the flow of the fuel G and thereby assist the diffusion of the fuel G.

Figure 15:
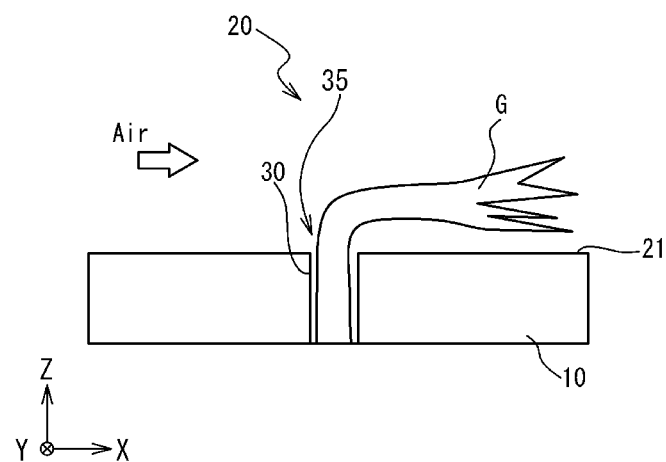
FIG. 15 is a schematic diagram schematically illustrating the fuel injection behavior in the combustor according to the second embodiment, in the case when the flying speed is high.

FIG. 15 is, on the other hand, a schematic diagram schematically illustrating the fuel injection behavior in the combustor according to the present embodiment, in the case when the flying speed is high. It should be noted that FIG. 15 is a section view illustrating a portion near the opening of a fuel injector 20.

As illustrated in FIG. 15, the self-extinguishing member 36 self-extinguishes in the combustor 12, after a certain time elapses from the state illustrated in FIG. 14. The self-extinguishment of the self-extinguishing member 36 allows the fuel injection orifice 35 of the fuel injector 20 to inject the fuel G in the vertical direction (+z direction).

The remaining structure and operation are the same as those of the first embodiment.

Figure 16:
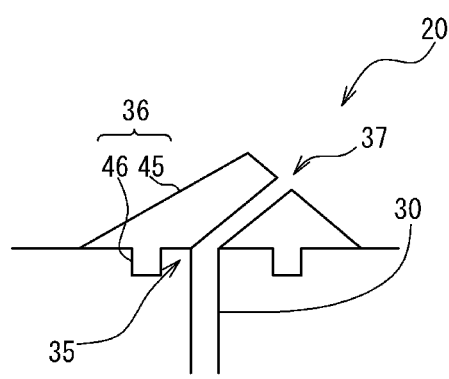
FIG. 16 is a section view schematically illustrating an example of how to attach a self-extinguishing member according to the second embodiment.

FIG. 16 is a section view schematically illustrating an example of how to attach a self-extinguishing member according to the present embodiment. The self-extinguishing member 36 includes a self-extinguishing member main body 45 and protruding parts 46. The body 10 is machined to form grooves or holes to be engaged with the protruding parts 46. The self-extinguishing member main body 45 is coupled with the body 10, for example, by engaging the protruding parts 46 with the grooves or holes thus machined. The self-extinguishing member main body 45 may be coupled with the body 10 by applying an adhesive to protruding parts 46 to be adhered with the grooves or holes of the body 10.

The present embodiment also achieves a similar advantage to the first embodiment. Additionally, the self-extinguishing member 36, which protrudes from the wall surface 21, disturbs the flow of the air and thereby assists the diffusion of the fuel G.

Third Embodiment

In the present embodiment, the fuel injection direction in the case when the self-extinguishing member still remains is different from that in the first embodiment. In the following, a description is mainly given of the difference in detail.

Figure 17:
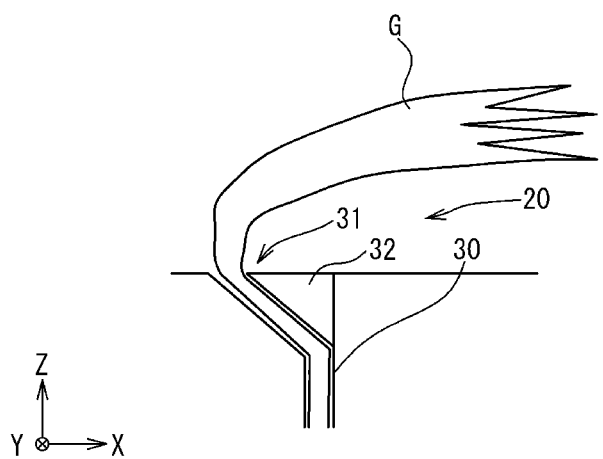
FIG. 17 is a schematic diagram schematically illustrating the fuel injection behavior in a combustor according to a third embodiment, in the case when the flying speed is low.

FIG. 17 is a schematic diagram schematically illustrating the fuel injection behavior in a combustor according to the present embodiment, in the case when the flying speed is low. It should be noted that FIG. 17 is a section view illustrating a portion near the opening of a fuel injector 20.

As illustrated in FIG. 17, the fuel injection orifice (opening) 31 and the self-extinguishing member 32 of the fuel injector 20 are configured so that the fuel G is injected in an opposite direction compared with the case illustrated in FIG. 7B in the first embodiment, that is, an opposite direction to the air flow direction (−x direction). Also in this case, the penetration height can be reduced as is the case with FIG. 7B. Additionally, the fuel G is expected to be diffused more evenly compared with the case illustrated in FIG. 7B, since the diffusion is enhanced due to a longer traveling distance of the fuel G in the combustor 12 and a larger shearing force acting between the air and the fuel G.

Figure 18:
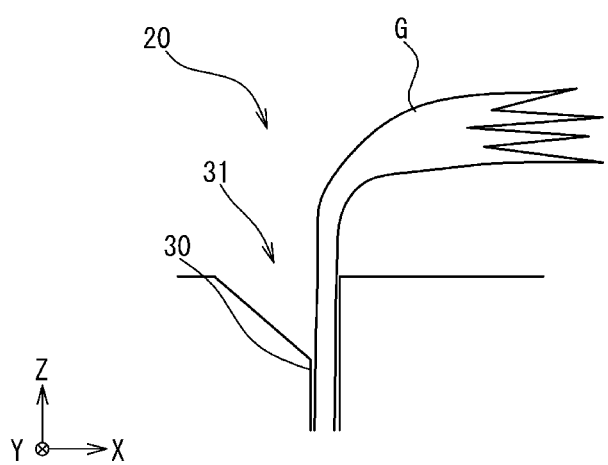
FIG. 18 is a schematic diagram schematically illustrating the fuel injection behavior in the combustor according to the third embodiment, in the case when the flying speed is high.

FIG. 18 is, on the other hand, a schematic diagram schematically illustrating the fuel injection behavior in the combustor according to the present embodiment, in the case when the flying speed is high. It should be noted that FIG. 18 is a section view illustrating a portion near the opening of a fuel injector 20.

As illustrated in FIG. 18, the self-extinguishing member 32 self-extinguishes in the combustor 12, after a certain time elapses from the state illustrated in FIG. 17. The self-extinguishment of the self-extinguishing member 32 allows the fuel injection orifice 31 of the fuel injector 20 to inject the fuel G in the vertical direction (+z direction).

The remaining structure and operation are the same as those of the first embodiment.

The present embodiment also achieves a similar advantage to the first embodiment. Additionally, since the fuel injection orifice (opening) 31 and the self-extinguishing member 32 of the fuel injector 20 are configured so that the fuel G is injected in an opposite direction compared with the case illustrated in FIG. 7B in the first embodiment, the diffusion is enhanced and the fuel G is expected to be diffused more evenly.

Fourth Embodiment

In the present embodiment, the fuel injection direction in the case when the self-extinguishing member still remains is different from that in the second embodiment. In the following, a description is mainly given of the difference in detail.

Figure 19:
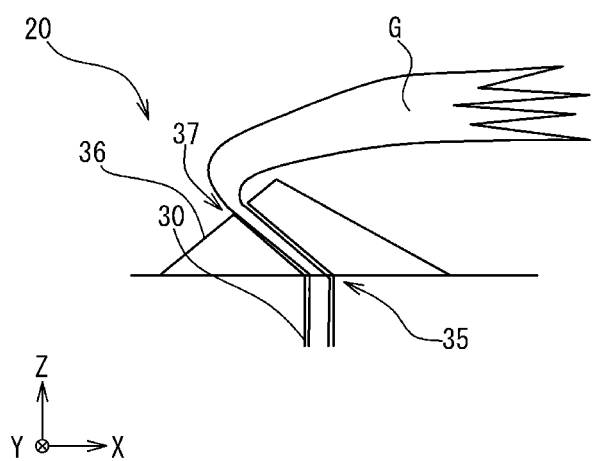
FIG. 19 is a schematic diagram schematically illustrating the fuel injection behavior in a combustor according to a fourth embodiment, in the case when the flying speed is low.

FIG. 19 is a schematic diagram schematically illustrating the fuel injection behavior in a combustor according to the present embodiment, in the case when the flying speed is low. It should be noted that FIG. 19 is a section view illustrating a portion near the opening of a fuel injector 20.

As illustrated in FIG. 19, the self-extinguishing member 36 is configured so that the fuel G is injected in an opposite direction compared with the case illustrated in FIG. 14 in the second embodiment, that is, an opposite direction to the air flow direction (−x direction). Also in this case, the penetration height can be reduced as is the case with FIG. 14. Additionally, the fuel G is expected to be diffused more evenly compared with the case illustrated in FIG. 14, since the diffusion is enhanced due to a longer traveling distance of the fuel G in the combustor 12 and a larger shearing force acting between the air and the fuel G.

Figure 20:
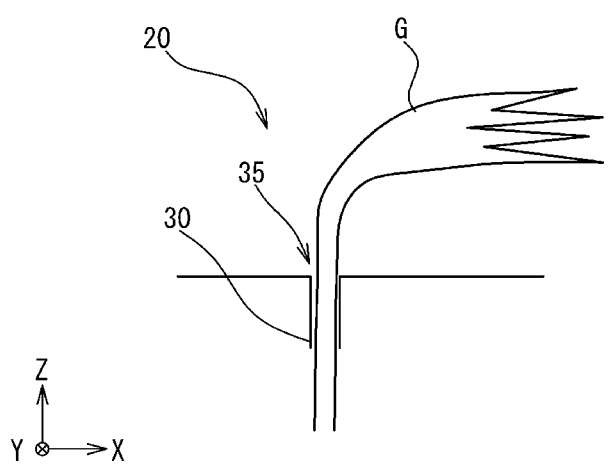
FIG. 20 is a schematic diagram schematically illustrating the fuel injection behavior in the combustor according to the fourth embodiment, in the case when the flying speed is high.

FIG. 20 is, on the other hand, a schematic diagram schematically illustrating the fuel injection behavior in the combustor according to the present embodiment, in the case when the flying speed is high. It should be noted that FIG. 20 is a section view illustrating a portion near the opening of a fuel injector 20.

As illustrated in FIG. 20, the self-extinguishing member 36 self-extinguishes in the combustor 12, after a certain time elapses from the state illustrated in FIG. 19. The self-extinguishment of the self-extinguishing member 36 allows the fuel injection orifice 35 of the fuel injector 20 to inject the fuel G in the vertical direction (+z direction).

The remaining structure and operation are the same as those of the second embodiment.

The present embodiment also achieves a similar advantage to the second embodiment. Additionally, since the self-extinguishing member 36 is configured so that the fuel G is injected in an opposite direction compared with the case illustrated in FIG. 14 in the second embodiment, the diffusion is enhanced and the fuel G is expected to be diffused more evenly.

The present invention effectively provides a jet engine, flying object and method of operating a jet engine which achieve a stable operation at a lower speed without largely remodeling the body. Also, the present invention effectively provides a jet engine, flying object and method of operating a jet engine which avoid fuel reaching a region in which the flame is difficult to be held, without largely remodeling the body.

Although examples in which a jet engine is applied to a flying object are described in the present embodiments, the present embodiments are not limited to the above-described examples; the present embodiments may be applied to multi-stage rockets and aircrafts which include a rocket engine and a jet engine.

It would be apparent that the present invention is not limited to the above-described embodiments and the respective embodiments may be accordingly modified or changed within the scope of the present invention. Also, various techniques used in the respective embodiments and modification examples may be applied to other embodiments and modification examples as long as no technical conflict occurs.

The present application claims a priority based on Japanese Patent Application No. 2014-74215, filed on Mar. 31, 2014, and the disclosure of this base application is incorporated herein in its entirety by reference.

The invention claimed is:

1. A jet engine, comprising:
an inlet taking air; and
a combustor burning fuel with the air,
wherein the combustor includes:
an injector having an opening which is formed on a wall surface of the combustor and through which the fuel is injected,
wherein the injector includes a self-extinguishing member which is arranged in the opening to protrude from an inner surface of the opening or to cover at least a part of the opening, and which fully extinguishes by a time at which a speed of the jet engine reaches a cruising speed so that an injection direction of the fuel is modified, and
wherein the self-extinguishing member includes a material which loses a shape thereof due to a thermal or aerodynamic effect.

2. The jet engine according to claim 1, wherein the material extinguishes without being burnt.

3. The jet engine according to claim 1, wherein the material includes ablation material.

4. The jet engine according to claim 1, wherein the self-extinguishing member is disposed at the opening so that the injection direction of the fuel is modified in an opposite direction to a flowing direction of the air.

5. The jet engine according to claim 1, wherein an angle between the injection direction of the fuel and a direction perpendicular to a flow direction of the air before the self-extinguishing member is fully extinguished is larger than the angle after the self-extinguishing member is fully extinguished.

6. A flying object, comprising:
a jet engine; and
a rocket motor connected to the jet engine, wherein the jet engine includes:
an inlet taking air; and
a combustor burning fuel with the air,
wherein the combustor includes:
an injector having an opening which is formed on a wall surface of the combustor and through which the fuel is injected,
wherein the injector includes a self-extinguishing member which is arranged in the opening to protrude from an inner surface of the opening or cover at least a part of the opening, and which fully extinguishes by a time at which a speed of the flying object reaches a cruising speed of the jet engine so that an injection direction of the fuel is modified, and
wherein the self-extinguishing member includes a material which loses a shape thereof due to a thermal or aerodynamic effect.

7. The flying object according to claim 6, wherein an angle between the injection direction of the fuel and a direction perpendicular to a flow direction of the air before the self-extinguishing member is fully extinguished is larger than the angle after the self-extinguishing member is fully extinguished.

8. A method of operating a jet engine including:

an inlet taking air; and a combustor burning fuel with the air, wherein the combustor includes:

an injector having an opening which is formed on a wall surface of the combustor and through which the fuel is injected, wherein the injector includes a self-extinguishing member which is arranged in the opening to protrude from an inner surface of the opening or to cover at least a part of the opening, and which fully extinguishes by a time at which a speed of the jet engine reaches a cruising speed, so that an injection direction of the fuel is modified, and wherein the self-extinguishing member includes a material which loses a shape thereof due to a thermal or aerodynamic effect, the method comprising:

injecting the fuel from the opening; and injecting the fuel from the opening after the self-extinguishing member is fully extinguished by the time at which the speed of the jet engine reaches the cruising speed, so that the fuel is injected in a different direction from the injection direction of the fuel before the self-extinguishing member is fully extinguished.

9. The method of operating a jet engine according to claim 8, wherein an angle between the injection direction of the fuel and a direction perpendicular to a flow direction of the air before the self-extinguishing member is fully extinguished is larger than the angle after the self-extinguishing member is fully extinguished.

\* \* \* \* \*